(No Model.)  2 Sheets—Sheet 1.

H. DAUFEN.
MACHINE FOR MAKING AXES.

No. 259,824. Patented June 20, 1882.

WITNESSES  INVENTOR (No Model.) 2 Sheets—Sheet 2.

H. DAUFEN.
MACHINE FOR MAKING AXES.

No. 259,824. Patented June 20, 1882.

WITNESSES
Wm. F. Reese.
H. B. Moulton

INVENTOR
Henry Daufen
by F. W. Ritter Jr.
Atty

UNITED STATES PATENT OFFICE.

HENRY DAUFEN, OF PITTSBURG, PENNSYLVANIA, ASSIGNOR OF ONE-HALF TO HENRY J. DAUFEN, OF SAME PLACE.

MACHINE FOR MAKING AXES.

SPECIFICATION forming part of Letters Patent No. 259,824, dated June 20, 1882.

Application filed December 31, 1881. (No model.)

*To all whom it may concern:*

Be it known that I, HENRY DAUFEN, a citizen of the United States, residing at Pittsburg, in the county of Allegheny and State of Pennsylvania, have invented certain new and useful Improvements in Machines for Making Axes, Hatchets, &c.; and I hereby declare the following to be a full, clear, and exact description of the same, reference being had to the accompanying drawings, in which—

Figure 1:
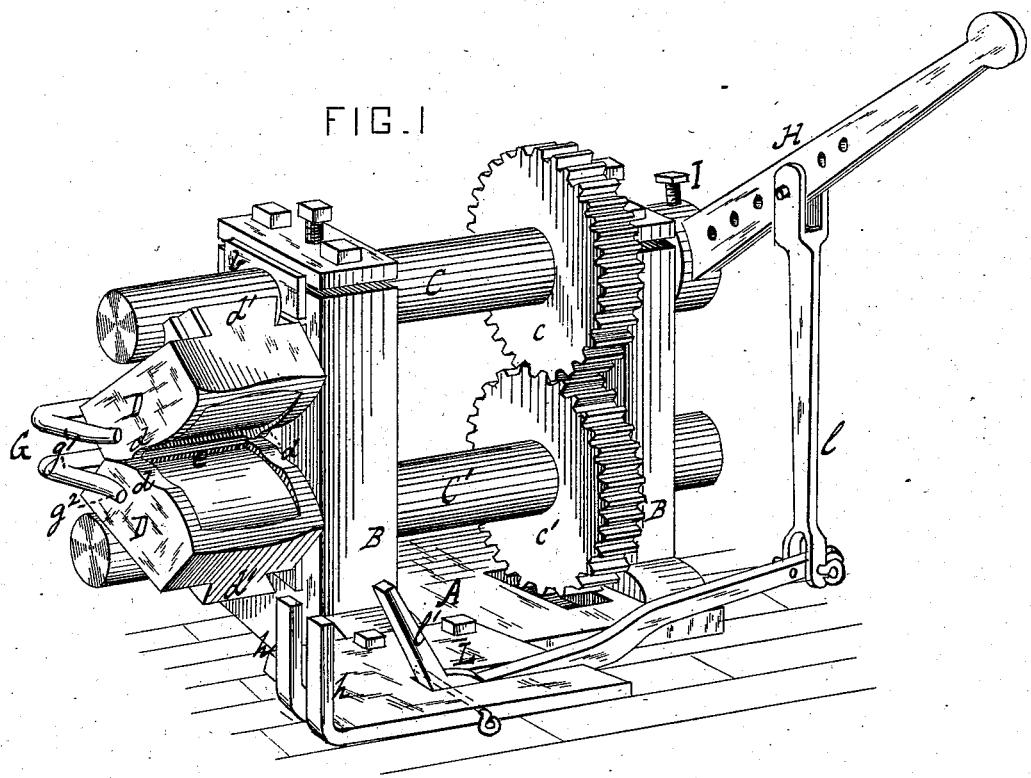
Figure 2:
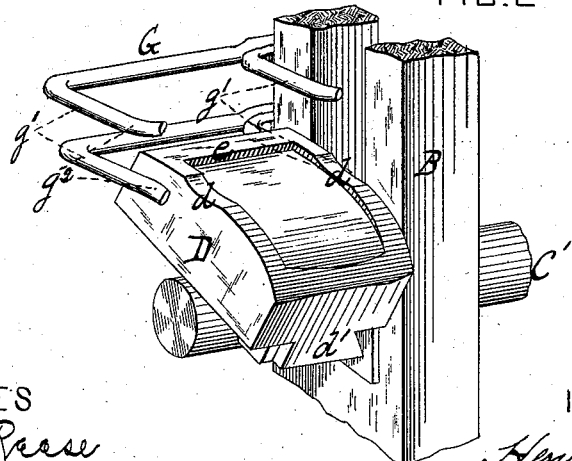
Figure 3:
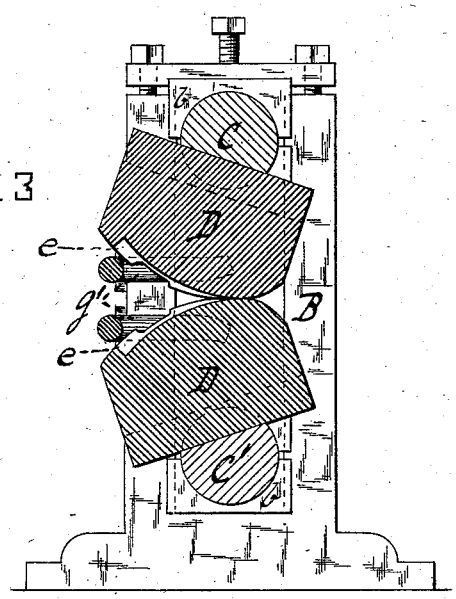
Figure 4:
Figure 5:
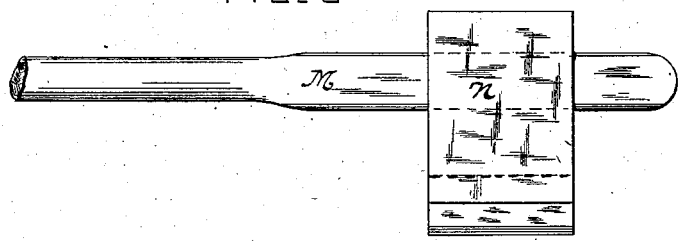

Figure 1 is a perspective view of devices embodying my invention, the oscillating dies being shown in position to receive or discharge a blank. Fig. 2 is a similar view of the lower die and the mandrel-guides to show the relation of the guides and dies. Fig. 3 is a sectional view of the dies in the position they occupy at the close of the shaping and welding operation. Fig. 4 represents a blank, and Fig. 5 the same bent and arranged on the mandrel for welding and shaping.

Like letters refer to like parts wherever they occur.

In the manufacture of ax-polls, hatchets, and like articles several different methods are commonly followed. In some cases the blank is shaped between compressing-jaws and the eye punched while the blank is thus held. In other cases a blank is first forged or rolled to the desired pattern and subsequently folded and welded by forging the same under a trip-hammer, or by means of hammer-dies having suitable matrices which weld up the blank and shape the poll, while in still other cases the ax-poll has been formed by passing a previously-shaped blank between rolls which folded and welded the blank. In each and all of the above-recited methods, however, complicated machinery is required, and the blank is left with large fins on both sides, which add greatly to the labor of grinding and finishing, while in order to obtain a full square head the blank has to be sawed off at the cost of additional time and labor and loss of stock.

The object of the present invention is to provide simple, durable, and efficient mechanism for welding and shaping ax-polls, hatchets, &c., from previously-prepared blanks, either with or without the insertion and welding thereto of the steel bit, and in such manner as to obtain a perfect head without the necessity of sawing off the blank to avoid the formation of fins, and to thus decrease the subsequent labor of grinding and finishing the ax or like article.

I will now proceed to describe my invention, so that others skilled in the art to which it appertains may apply the same.

In the drawings, A indicates a bed upon which are erected suitable housings, B B, wherein are journaled in brasses or boxes *b b* two shafts or rolls, C C′, which project beyond the housings at either end, the projecting portions of said shafts having dovetailed recesses or equivalent means for securing dies thereto.

Keyed or otherwise secured to the shafts or rolls C C′ are pinions *c c′*, which gear with each other and cause the shafts to move in unison.

The rolls or shafts C C′ may be oscillated by power applied thereto by means of any of the well-known forms of gearing employed for such purpose.

D D indicate the shaping and welding dies for welding together and shaping the blank to form ax-polls, hatchets, or like articles. The adjacent faces of the dies D D are curved on the arcs of circles whose centers are the same as the respective shafts C C′ and whose peripheries meet, and in the face of each die is sunk a cavity corresponding to one-half of the ax-poll or like article to be formed, so that the two dies in their oscillation shall inclose a figure exactly corresponding to the article to be produced, whether the same be an ax-poll only or an ax-poll with its bit attached. The walls of the matrices are cut away at points *d d* in line with the eye of the poll sufficiently to admit the eye-pin or mandrel M. The recesses *d* and the wall *e* of the matrix will serve as gages to facilitate the introduction and placing of the blank to be operated upon.

The dies D D are provided with dovetailed lugs *d′ d′*, by which or equivalent means they may be secured to the shafts or rolls C C′, substantially as shown in Fig. 1.

In order to secure a perfect eye and true taper of the blade, it is desirable to maintain and guide the mandrel in a horizontal plane which passes between the dies, and for this purpose I provide a mandrel-guide, G, which is secured to one of the housings B at the proper height by set-screws, or in other suitable manner. This mandrel-guide is formed of two forked bars, whose tines $g'$ $g'$ embrace the oscillating dies above and below the bite thereof, projecting as far forward as a line intersecting the axes of the shafts or rolls to which the dies are attached, and the extremities of the tines $g'$ are usually bent slightly out, as at $g^2$, to insure the entrance and to correct the position of mandrel M.

Secured to or formed on bed A, in front of oscillating dies D D, is a stripper for removing the ax-poll from the mandrel. This stripper consists of a fork or two uprights, $h\ h$, in front of which, and on a line passing between the same, is pivoted an elbow-lever, L, the long arm of which is connected by a link, $l$, to a crank-arm, H, attached to one of the shafts which carry the dies.

The crank-arm H, by which the elbow-lever L of the stripper is actuated, is adjustably secured to the shaft C by a set-screw, I, and has a series of holes by which the connection of the link $l$ may be varied, thus enabling the operator to change the throw of the short arm $l'$ of the lever which forces the mandrel or pin from the eye of the ax-poll.

M indicates a mandrel for forming the eye of the ax or equivalent article, and N represents a blank from which the ax-poll is to be formed. The blank N may be of any desired pattern, several of which are now well known to the trade, and may be produced by either forging or rolling. Such a blank having been folded, as at $n$, and having the mandrel M inserted between the folds to form and preserve the eye, the bit being omitted or inserted, as indicated in dotted line, Fig. 5, as the case may be, is brought to a welding-heat and then inserted between the oscillating dies D D, when they are in the position shown in Fig. 1, the head of the blank resting against the wall $e$ of the matrix and the mandrel M resting within the recesses $d$. The oscillation of the dies, as they change from the position shown in Fig. 1 to that shown in Fig. 3, compresses and forms the ax-poll, causing the head of the poll to fill out fully at the corners, while the surplus metal is forced toward the blade. The welding together of the fold is also done at the same oscillation of the dies, and if the bit has been inserted before entering the blank between the dies the article will come from the dies complete, substantially devoid of fins, and ready to be ground and polished at the cost of little additional labor. As the dies pass the vertical central line in changing position from that shown in Fig. 1 to what is shown in Fig. 3 the ends of the mandrel enter between the forks $g'$ $g'$ of the mandrel-guide, which thereafter center and preserve the position of the blank, so that the blade of the ax will be uniformly drawn and tapered.

In describing the operation of the oscillating dies I have referred to the shaping and welding as done at a single pass; but it is evident that the blank may remain in the dies during several passes, if found desirable.

When the ax-poll is removed from the dies it is stripped from the mandrel by placing the mandrel between the uprights $h\ h$, the edge of the ax-poll resting against the same, and the end of the mandrel in line with the short arm $l'$ of the pivoted elbow-lever L. The arm $l'$ of the elbow-lever, being then rocked forward at the next oscillation of shaft C, will strike the end of the mandrel and force the mandrel out from the eye of the ax-poll.

In the foregoing description I have spoken of the dies as secured to the projecting ends of shafts C C'; but it is evident that the dies may be formed on or attached to the body of the rolls or shafts C C' between the housings B B and the forked mandrel-guide occupy the same relative position to the dies when thus placed without changing the combinations or departing from the spirit or scope of my invention.

I am aware that in drop-dies for forging axes dies have been heretofore employed both for shaping the poll and finishing the ax—as, for instance, such as are shown in the patent of Palmer and Hubbard, No. 118,264, August 22, 1871—and therefore do not herein claim broadly dies having cavities corresponding to the ax-poll or article to be produced, when used as drop-dies, for the reason that by such dies so employed the metal is displaced laterally in all directions, and to avoid the formation of fins several sets of dies and repeated operations on the blank are required, whereas in my combination of oscillating dies the rear wall of the die acts as a guide in introducing the blank, and the oscillation of the dies forces the surplus metal into the weld, displaces or forces out any scale or foreign substance which would interfere with the welding, and tapers the blade, giving a defined edge to the bit without the formation of fins and at a single operation, thus increasing the yield of the machine, decreasing the labor, and consequently decreasing the cost of manufacture. Therefore,

Having thus described my invention, what I claim in machinery for shaping and welding ax-polls and like articles, and desire to secure by Letters Patent, is—

1. The combination of two oscillating shaping and welding dies having the adjacent faces curved on arcs of circles whose centers are the same as their respective shafts and whose peripheries meet, each of said dies having a cavity or matrix corresponding to one-half of an ax-poll, substantially as and for the purpose specified.

2. The combination, with the two oscillating welding and shaping dies having matrices corresponding to an ax-poll or like article to be produced, of the mandrel-guide arranged between the axes of the dies to maintain and guide the mandrel parallel with the axes of the dies, substantially as and for the purpose specified.

3. The combination, with two oscillating shaping and welding dies having matrices adapted to form an ax-poll or like article, of a mandrel-guide having guide-arms which extend in a horizontal plane between the axes of the dies and on the two sides of the dies and are adapted to guide both ends of the mandrel, substantially as and for the purpose specified.

4. The combination, with oscillating dies D D, of forked mandrel-guide $g'$ $g'$, having its tines bent outward, as at $g^2$ $g^2$, substantially as and for the purpose specified.

5. The ax-poll stripper composed of the fork or uprights and pivoted elbow-lever, the several parts relatively arranged and combined to coact, substantially as and for the purpose specified.

6. The combination of the uprights $h$ $h$, the elbow-lever L, pivoted in front of and between the same, the crank-arm adjustably attached to the die-shaft, and the interposed adjustable link for connecting the elbow-lever and crank-arm, substantially as and for the purpose specified.

7. The combination of two oscillating shaping and welding dies having the adjacent faces curved on arcs of circles whose centers are the same as their respective shafts and whose peripheries meet, each of said dies having a matrix or cavity corresponding to one-half of an ax-poll, the walls of said matrices having mandrel-notches in the line of the eye of the ax-poll, substantially as and for the purpose specified.

In testimony whereof I affix my signature in presence of two witnesses this 24th day of December, 1881.

HENRY DAUFEN.

Witnesses:
   THOS. A. NOBLE,
   SAMUEL J. CHAMBERLIN.